United States Patent [19]
Taylor et al.

[11] 3,720,749

[45] March 13, 1973

[54] TREATMENT OF NICKEL LEACH LIQUOR

[75] Inventors: Melvin L. Taylor, Arvada; Nelson J. Ronzio, Golden, both of Colo.

[73] Assignee: American Metal Climax, Inc., New York, N.Y.

[22] Filed: Aug. 26, 1970

[21] Appl. No.: 67,249

[52] U.S. Cl. .....................423/141, 75/101, 75/119, 423/123
[51] Int. Cl. .........................C01g 51/04, C01g 53/04
[58] Field of Search ...................23/183; 75/101, 119

[56] References Cited

UNITED STATES PATENTS

| | | | |
|---|---|---|---|
| 3,466,144 | 9/1969 | Kay | 23/183 |
| 2,842,436 | 7/1958 | Dasher | 75/101 |
| 2,899,300 | 8/1959 | Bailey | 75/101 |
| 2,746,856 | 5/1956 | Mancke | 75/101 X |

Primary Examiner—Oscar R. Vertiz
Assistant Examiner—G. Alvaro
Attorney—Kasper T. Serijan

[57] ABSTRACT

Nickel and cobalt are recovered from acid leach liquor containing such impurities as iron and aluminum obtained from the acid leaching of nickeliferous materials (such as sulfuric acid or nitric acid leach liquor), e.g. low-grade nickeliferous oxidic materials by adjusting the leach liquor, in the case of a sulfuric acid leach, to a pH range of about 0.5 to 4, or, more advantageously, to about 0.6 to 1.5, or in the case of a nitric acid leach to a pH of about 0.15 to 2.5, at an elevated temperature in excess of 130°C at a pressure ranging from about 225 psig to 1000 psig to precipitate major amounts of the iron and aluminum, which precipitate is then separated from the leach liquor. Thereafter, the nickel and cobalt are separated from the treated leach liquor.

12 Claims, No Drawings

TREATMENT OF NICKEL LEACH LIQUOR

This invention relates to the recovery of nickel and cobalt from nickeliferous materials, such as low-grade nickeliferous oxidic ores, and, in particular, to the treatment of acid leach liquor obtained from the acid leaching of nickeliferous ores, whereby to separate such impurities as iron and aluminum, among others, from the nickel and cobalt constituents in the liquor.

The State of the Art

The state of the art relevant to this invention is set forth in quite some detail in U.S. Pat. No. 3,466,144, which issued on Sept. 9, 1969, in the name of Herbert Kay (assigned to the same assignee) and, for the purpose of brevity, the state of the art described therein is incorporated herein by reference as applying to the background leading to the present invention.

The aforementioned patent is directed generally to a hydrometallurgical process using a sulfuric acid leach or a sulfation roast with a water leach for the recovery of nickel (and cobalt) values from oxidic materials containing up to 12 percent magnesia. The ore is pressure leached with sulfuric acid at a temperature of about 400°F to 500°F (200°C to 292°C) under a pressure of about 450 psig in an autoclave to solubilize substantially all of the nickel and cobalt. A certain amount of impurities, such as iron and aluminum, also go into the solution which must thereafter be removed before recovering the nickel and cobalt from the pregnant liquor. The method disclosed in the patent is to first adjust the pH of the pregnant liquor by the addition of magnesia at a temperature of about 50°C to 100°C to within a narrow pH range of about 3.5 to 4.5 at atmospheric pressure to precipitate iron, aluminum and silicon. The stated pH range is important as pH's below 3.5 and above 4.5 adversely affect the efficiency of the separation. Following the precipitation and separation of the aforementioned impurities, the pH of the pregnant or leach liquor is raised to at least 7 by the further addition of magnesia to form the nickel and cobalt precipitate which is then separated from the liquor.

While the results obtained by the foregoing method are satisfactory, care must be exercised to assure control over the narrow pH range. For example, it has been found that at a pH of 1 at ambient temperature and pressure (e.g. 20°C and 14.5 psig), no iron or aluminum will precipitate. At a pH of 2 to 3, the iron begins to precipitate and, at a pH of about 5.6, while substantially all of the iron and aluminum are precipitated, a substantial amount of nickel is brought down with the precipitate. In addition, the precipitate obtained is not very dense, it tends to be voluminous and, therefore, particular care must be taken to separate the precipitate from the mother liquor when countercurrent decantation is employed.

A method has now been discovered which overcomes the foregoing difficulties and which enables a broader range of pH control for precipitating such impurities as iron and aluminum. The precipitating reaction employed in the method is faster in that higher temperatures are employed and, in addition, a more dense precipitate is obtained which is easy to separate from the pregnant liquor or leach liquor pulp using countercurrent decantation methods of separation.

It is an object of the invention to provide an improved process in which nickel and/or cobalt leached from nickeliferous materials can be efficiently and economically separated from the leached pulp or pregnant liquor containing these elements substantially devoid of aluminum and iron.

Another object is to provide an improved nickel-recovery process utilizing an acid leach which produces a commercially acceptable nickel product with satisfactory yields and purity.

These and other objects will more clearly appear when taken in conjunction with the following description and the appended claims.

Statement of Invention

Stating it broadly, the present invention is directed to the recovery of nickel and cobalt from nickeliferous oxidic materials, such as low-grade ore, wherein a pulp of the ore is acid leached to produce a pregnant acid leach liquor containing a high recovery of said nickel and cobalt and such impurities as iron and aluminum, among others. To dissolve the metal values, ore pulp is advantageously leached with either a sulfuric acid or a nitric acid solution at an elevated temperature and pressure. The resulting leach solution may or may not be separated from the insolubles preparatory to the recovery of nickel and/or cobalt. Where the pregnant solution has been separated from the leached pulp, the nickel and cobalt values are then separated from the solution as follows: (1) the pH of the pregnant solution is adjusted at an elevated temperature in excess of 130°C and at a pressure of about 225 psig to 1000 psig by adding a soluble neutralizing agent, e.g. magnesia, to raise the pH of the liquor, in the case of a sulfuric acid leach, to within a range of about 0.5 to 4, or a pH range of about 0.15 to 2.5 in the case of a nitric acid leach, whereby to precipitate major amounts of the iron and aluminum, (2) the iron and aluminum precipitate is then separated from the liquor, and (3) the nickel and cobalt are then recovered from the liquor. However, where the pregnant liquor is not separated from the pulp, the leached pulp is neutralized as stated above and the precipitated iron and aluminum separated with the leached pulp by countercurrent decantation.

The nickel and cobalt recovery is achieved from the pregnant liquor by further increasing the pH of the liquor to a value over 7, as by adding more magnesia, to precipitate the nickel and cobalt values as the hydroxides. The nickel is then separated from the cobalt in the usual way.

Advantageously, the temperature found suitable for achieving good separation of the impurities from the pregnant liquor ranges from about 200°C to 280°C, the temperature of approximately 240°C (e.g. 240°C ± 10°C) being particularly advantageous. The pressure may range from about 225 to 1000 psig and, more particularly, from about 450 to 600 psig.

While good recoveries are obtained with sulfuric acid at pH's ranging from 0.5 to 4, more advantageous results are obtained at a pH of about 0.6 to 1.5, with a pH of approximately 1 being optimum. Likewise, while the pH range in working with nitric acid may vary broadly from about 0.15 to 2.5, the range of about 0.3 to 1 is preferred. The foregoing ranges of temperature, pressure and pH can be used interchangeably, that is, the pH range for sulfuric acid of either 0.5 to 4 or 0.6 to 1.5, and of nitric acid of 0.15 to 2.5 or 0.3 to 1, can be used with temperatures of over 130°C or within the range of about 200°C to 280°C and with pressures of either 225 to 1000 psig or 450 to 600 psig.

As will be apparent to one skilled in the art, various kinds of soluble neutralizing agents may be employed, such as MgO, CaO, NaOH, and the like. For example, the use of coral mud (i.e. $CaCO_3$) is particularly advantageous from an economic viewpoint.

By employing high temperature and high pressure conditions in the treatment of the pregnant liquor or leached pulp with, for example, magnesium oxide, most of the iron and aluminum can be precipitated in the autoclave with little or no loss of the nickel and cobalt, since any precipitate which contains some nickel and cobalt can be recycled to the high pressure acid leach for recovery. After the iron and aluminum are precipitated, they may be separated from the pregnant solution or leached pulp by countercurrent decantation similar to the separation technique described in the aforementioned U.S. Pat. No. 3,466,144.

Taking low-grade lateritic nickel ore as an example, in one embodiment, the pulp of the ore is digested in a sulfuric acid solution in an autoclave at an elevated temperature and pressure (e.g. 240°C and 775 psig, a portion of the pressure being nitrogen over pressure, steam pressure accounting for 470 psig), following which magnesia is injected at the same temperature of about 240°C±10° over a pressure ranging from about 450 to 600 psig. However, the nitrogen over pressure is not necessary to the invention. As the pH rises to 1, over 85 percent each of iron and aluminum is precipitated. By the time the pH reaches about 3.9, 99.9 percent of the iron and 97 percent of the aluminum has been precipitated. By contrast, at ambient conditions (i.e. atmospheric pressure and temperature) and at a pH of 1, no iron or aluminum is precipitated.

Thus, by removing substantially all of the iron and aluminum, the pregnant liquor can thereafter be easily treated with magnesium oxide or other neutralizing agent at ambient temperature and pressure to remove the nickel and cobalt as hydroxides. Or the solubilized nickel and cobalt may at the appropriate pH be precipitated from the pregnant liquor as the sulfide using $H_2S$ as the precipitant and the nickel and cobalt thereafter recovered using known methods. The sulfuric acid or nitric acid leaching of nickel laterite prior to the foregoing treatment enables the extraction of over 90 percent nickel, most of which nickel is recovered in the final step.

Details of the Invention

As illustrative of the invention, the following examples are given:

Example 1

A lateritic nickel ore containing 1.28% Ni, 0.16% Co, 43.4% Fe, 3.38% Al., 3.0% Cr, 1.0% Mn, 0.56% Mg, 0.2% Ca, 5.8% $SiO_2$, and 0.3% $SO_4$) among others, is provided in the form of a pulp slurry with a solids content of about 35%, the slurry containing about 130 grams per liter of magnesium sulfate, the sulfuric acid injected into the slurry being proportioned on the basis of 0.26 part by weight of acid to one part by weight of ore taken on the dry basis. The pulp is digested at a temperature of about 240°C±5° at a total pressure of about 775 psig (470 psig steam pressure) in an autoclave.

Following a suitable leaching period after the injection of sulfuric acid in the autoclave, a sample of pregnant liquor or leach pulp is removed and analyzed to determine the percent of the elements Ni, Co, Fe and Al extracted from the ore. After a given time period following the injection of the acid, magnesia is added to the leach liquor to raise the pH to a value above 0.5 to precipitate iron and aluminum (at 240°C± 5° and at 450 to 600 psig) and a sample of the pregnant liquor again taken and analyzed for the same constituents on the percent extraction basis. Then, by comparing the latter analysis with the former, the percent iron and aluminum precipitated from the pregnant liquor at the particular pH can be determined. Table 1 represents the data obtained by using the foregoing procedure, the data illustrating the effect of pH (as determined by further additions of magnesia) on the precipitation of iron and aluminum.

TABLE 1

[High temperature neutralization with magnesium oxide]

| Test number | Time after acid injection, mins. | Time after first MgO injection, mins. | H of liquor | Leach extractions,* percent | | | | Percent precipitated from solution | | | |
|---|---|---|---|---|---|---|---|---|---|---|---|
| | | | | Ni | Co | Fe | Al | Ni | Co | Fe | Al |
| 1A | 46 | | 0.40 | 94 | 90 | 0.68 | 23 | 0 | 0 | 0 | 0 |
| 1B | 63 | 15 | 0.65 | 94 | 89 | 0.19 | 8 | 0 | 0 | 74 | 64 |
| 1C | 95 | 47 | 0.72 | 94 | 91 | 0.13 | 6 | 0 | 0 | 81 | 76 |
| 1D | 125 | 77 | 1.02 | 93 | 90 | 0.09 | 3 | 1.1 | 0 | 87 | 87 |
| 2A | 46 | | 0.42 | 95 | 94 | 0.74 | 29 | 0 | 0 | 0 | 0 |
| 2B | 63 | 15 | 0.88 | 94 | 94 | 0.12 | 6 | 1.1 | 0 | 84 | 79 |
| 2C | 99 | 50 | 1.22 | 92 | 93 | 0.05 | 2 | 3.2 | 1:1 | 95 | 92 |
| 2D | 138 | 90 | 3.88 | 84 | 89 | 0.001 | 1 | 10.5 | 5.3 | 99.9 | 97 |

* The percent leach extractions represent, at a given time, the amount of element remaining in solution as a percentage of the amount of the element contained in the raw feed ore.

Referring to Test 1A, it will be noted that about 46 minutes following the addition of acid, the percent extraction from the ore amounted to 94% Ni, 90% Co, 0.68% Fe and 23% Al. In Test 1B, it will be noted 63 minutes following the addition of acid and 15 minutes after the first injection of MgO, the pH rose to 0.65. This resulted in a drop in iron extraction from 0.68 percent to 0.19 percent or a removal of about 74 percent by precipitation, and a drop in aluminum extraction from 23 percent to 8% or a removal of about 64 percent by precipitation. In the case of Tests 1C and 1D, in which additional MgO was added to raise the pH, the precipitation of iron and aluminum is quite high at pH's of 0.72 and 1.02, respectively. In the latter test, only a small amount of nickel came down with the precipitate, the precipitate analysis showing a removal of about 85% Fe, and 87% Al from the pregnant liquor.

Referring to Tests 2A to 2D, it will be noted that with succeeding further additions of MgO, the pH of the pregnant liquor approaches 3.88. Thus, the precipitation of iron and aluminum based on the amounts in the pregnant liquor prior to precipitation reached substantially over 90 percent (Test 2D, 99.9% Fe and 97% Al at a pH of 3.88), except that some nickel and some cobalt came down with the precipitate. Where the amount of nickel and cobalt in the precipitate warrants it, the precipitate can be recycled back to the acid leaching stage for the further recovery thereof.

Example 2

A similar test on the ore of the same analysis was carried out in which a pulp slurry containing 35 percent solids (specific gravity is 1.5) was leached using 0.216 part by weight of sulfuric acid to 1 part by weight of ore on the dry basis, the amount of magnesium sulfate being about 115 grams per liter. However, magnesium sulfate need not be present insofar as the invention is concerned. The results are given in Table 2. It will be noted from Table 2 that when the pH following succeeding magnesium oxide additions (at 240°C±5° and 450 to 600 psig) reaches about 4.52 (Test 3D), a substantial amount of nickel and cobalt precipitates with the iron and aluminum. As will be noted, the solution contains small amounts of chromium, which element is not precipitated to any great extent with the iron and aluminum. However, this element is easily separated from the nickel and cobalt in subsequent treatments. Test 3C shows good separation of iron and aluminum at a pH of 3.93. However, since the precipitate contains some nickel and cobalt, it may be recycled to acid leaching.

As stated hereinabove, the pH of the sulfuric acid leach liquor during magnesium oxide treatment should not exceed 4. This is apparent from Table 2, Test 3D, where a pH of 4.52 resulted in precipitation of 17.2% Ni and 24.4% Co from the pregnant liquor. Tests have shown that magnesium oxide treatment at a pH range of 5.6 to 8.8, resulted in the precipitation of 88.4 percent of the nickel, 83.7 percent of the cobalt, and, when manganese and chromium were present, also 57.8 percent manganese and 30.6 percent chromium. Thus, the pH range of 0.5 to 4 for selectively precipitating iron and aluminum from sulfuric acid leach liquor is essential in achieving the results of the invention, especially the pH range of about 0.6 to 1.5.

Particularly good results were obtained with nitric acid leach solutions using an acid-to-ore ratio (dry weight of ore) of about 0.37 (e.g. 37 percent) at times ranging up to about 140 minutes at 240°C ±10°C in an ore referred to as "Mara Composite" containing 1.02% Ni, 0.105% Co, 47.0% Fe, 1.9% Al, 1.13% acid soluble Cr, 3.1 percent total Cr, 0.69% Mn, 0.42% Mg, 4.6% $SiO_2$ and 0.002% Ca. Neutralization with MgO was employed. As illustrative of the efficacy of nitric acid as a leach liquor, the following samples are given:

Example 3

A batch of the aforementioned "Mara Composite" ore is mixed with nitric acid solution to provide 0.37 lb. of acid per pound of dry ore, the resulting pulp being then fed to the autoclave where it is digested at a temperature of about 240°C ± 10°C at a total pressure of about 775 psig. for 60 minutes. The high temperature pre-neutralization of 1200 ml of the feed liquor is carried out in autoclave at 240°C by injecting magnesium oxide slurry into the autoclave. In one high temperature pre-neutralization test, it was found that 99.9 percent of the iron and 98.8 percent of the aluminum could be hydrolyzed by neutralizing with magnesium oxide slurry to a pH of about 0.72 at 240°C. Only 0.10 percent of the total nickel content was found in the hydrolysis product. The results obtained with respect to Fe and Al removal are set forth in Table 3. About 50 percent to approximately 56 percent of the chromium in the leach liquor was removed with the iron and aluminum.

TABLE 2

| Test number | Time after initial sample (min.) | Ml. MgO slurry | Gm. MgO | pH of liquor | Leach extractions,* percent | | | | | Percent precipitated from solution | | | | |
|---|---|---|---|---|---|---|---|---|---|---|---|---|---|---|
| | | | | | Ni | Co | Fe | Al | Cr | Ni | Co | Fe | Al | Cr |
| 3A | 0 | 0 | 0 | 0.40 | 96 | 95 | 0.54 | 36 | 6.4 | 0 | 0 | 0 | 0 | 0 |
| 3B | 19 | 66 | 17.7 | 1.08 | 95 | 95 | 0.15 | 14 | 5.9 | 1.0 | 0.1 | 72 | 62 | 7.8 |
| 3C | 35 | 102 | 27.4 | 3.93 | 87 | 85 | 0.004 | 4 | 5.9 | 9.4 | 10.4 | 99 | 90 | 7.8 |
| 3D | 53 | 127 | 34.0 | 4.52 | 80 | 72 | 0.00 | 0.3 | 4.6 | 17.2 | 24.4 | 100 | 99 | 28.1 |

*The percent leach extractions represent, at a given time, the amount of element remaining in solution as a percentage of the amount of the element contained in the raw feed ore.

TABLE 3

| Test number | Time after start of neutralization (min.)[1] | Approx. MgO in grams | Acidity of leach liquor | | Solution conc. gms./l. | | | | Percent change in solution comp.[2] | | | |
|---|---|---|---|---|---|---|---|---|---|---|---|---|
| | | | pH | G.p.l. $HNO_3$ | Ni | Co | Fe | Al | Ni | Co | Fe | Al |
| Feed liquor | | | | 76.1 | 6.2 | 0.64 | 4.0 | 9.4 | | | | |
| 4A | [3]31 | 41.7 | 0.1 | | | | | | | | | |
| 5A | [3]70 | 49.2 | 0.1 | | | | | | | | | |
| 6A | 97 | 55.6 | 0.21 | | 15.8 | 4.96 | 0.52 | 0.012 | 1.04 | −0.03 | 0.00 | −99.6 | −86.2 |
| 7A | 131 | 66.3 | 0.72 | | 3.4 | 4.82 | 0.52 | 0.002 | 0.09 | −0.10 | −0.24 | −99.9 | −98.8 |
| 8A final[4] | 140 | 66.3 | 0.54 | | 6.9 | 4.60 | 0.48 | 0.003 | 0.22 | −0.11 | −0.21 | −99.9 | −96.8 |

[1] The MgO slurry was injected with nitrogen pressure after the leach liquor temperature had stabilized at 240° C.±5° C.
[2] The "−" (minus sign) means removal of element from solution.
[3] Samples 4A and 5A reinjected into the autoclave after measuring pH.
[4] Analysis of material remaining in autoclave after cooling.

Example 4

The same ore as Example 3 was similarly treated in the autoclave with nitric acid (0.37 grams of acid per gram of ore) to provide a leach pulp at the start of the leach containing 35 percent solids. The approximate pulp volume of 1120 ml after 60 minutes leaching was neutralized for 15 minutes at 240°C ± 10°C with 47.8 grams of MgO which resulted in an iron removal of 98.1 percent and an aluminum removal of 74.8 percent at a pH of 0.45. The percent change of nickel and aluminum was small, that is +0.8 percent and +1.7 percent, respectively. Thirty minutes after neutralization with 47.8 grams MgO, 98.1 percent iron and 76.2 percent aluminum were removed, the change in nickel and cobalt being also very small, i.e. +0.8 percent and +0.9 percent, respectively.

Example 5

The effect of pH over a broad range on the removal of iron and aluminum will be apparent from Table 4. The tests were conducted using a simulated synthetic recycle leach solution of nitric acid. The assay of the solution prior to the tests comprised in grams per liter of 20 Ni, 0.4 Co, 6.0 Fe, 6.6 Al, 0.33 Cr, 2.8 Mn, 2 Mg, and 96 $HNO_3$. There was no pulp present in the solution. The neutralization tests were carried through a pH range (up to 4.3 and 5.75) until almost 100 percent of nickel was precipitated. It will be noted from Table 4 that substantially complete removal of iron and aluminum is obtained from a pH range of about 0.24 to below 2.82.

At about a pH of 2.82 substantial amounts of Ni and Co begin to precipitate. At a pH of 1.56, 95.1 percent chromium and 18.2 percent manganese were removed. Thus, the pH range for the nitric acid leach should not exceed 2.5 and ranges from 0.15 to 2.5 and, more advantageously, from about 0.3 to 1.

TABLE 4

| Test number | Time after start of neutralization (mins.) | Grams, MgO | Acidity of liquor pH | Acidity of liquor G.p.l., $HNO_3$ | Solution concentration, g.p.l. Ni | Co | Fe | Al | Percent removal from solution Ni | Co | Fe | Al |
|---|---|---|---|---|---|---|---|---|---|---|---|---|
| 9A | 24 | 51.6 |  | 39.8 | 16.2 | 0.30 | 0.046 | 0.108 | 0.02 | 0.20 | 99.0 | 98.0 |
| 10A | 54 | 65.5 | 0.24 | 11.3 | 16.2 | 0.30 | 0.005 | 0.24 | 0.06 | 0.26 | 99.9 | 95.5 |
| 11A | 77 | 68.9 | 0.72 | 3.3 | 15.2 | 0.30 | 0.002 | 0.06 | 0.05 | 0.24 | 100.0 | 98.8 |
| 12A | 101 | 75.5 | 1.56 | 0.3 | 9.8 | 0.28 | 0.001 | 0.03 | 34.5 | 5.7 | 100.0 | 99.4 |
| 13A | 113.5 | 81.3 | 2.82 |  | 3.8 | 0.20 | 0.001 | 0.007 | 73.8 | 31.3 | 100.0 | 99.3 |
| 14A | 135 | 86.9 | 5.75 |  | 0.44 | 0.03 | 0.001 | Nil | 96.9 | 89.4 | 100.0 | 100.0 |
| 15A final | 142 | 86.9 | 4.30 |  | 0.14 | 0.016 | 0.001 | Nil | 99.9 | 94.4 | 100.0 | 100.0 |

As stated hereinbefore, the invention is applicable to filtered pregnant liquor or to the leach liquor in the pulp form. The term "leach liquor" employed in the claims is meant to include either substantially clear pregnant liquor or leach liquor in the form of pulp.

The present invention is particularly adapted for use in the recovery of nickel and cobalt values from oxidic nickeliferous ores, e.g. lateritic ores of the limonite type. The ores contain on the average of about 0.5 to 2 percent nickel, up to 0.5 percent cobalt, up to 50 percent or more of iron, up to 10 percent silicon (as silica) and up to 5 percent aluminum. They may also contain up to 4 percent chromium, up to 0.1 percent copper, up to 0.1 percent of lead, up to 2 percent manganese and up to 8 percent or 12 percent magnesia.

Although the present invention has been described in conjunction with preferred embodiments, it is to be understood that modifications and variations may be resorted to without departing from the spirit and scope of the invention as those skilled in the art will readily understand. Such modifications and variations are considered to be within the purview and scope of the invention and the appended claims.

What is claimed is:

1. In a method of recovering nickel and cobalt from nickeliferous materials, wherein the material is acid leached with a solution selected from the group consisting of sulfuric acid and nitric acid to produce a leach liquor containing substantially said nickel and cobalt and also containing iron and aluminum, and wherein the iron and aluminum are thereafter separated from the nickel and cobalt, the improvement which comprises, adjusting said leach liquor to a pH over the range of about 0.5 to 4 where the leach liquor is a sulfuric acid solution and to a pH over the range of about 0.15 to 2.5 where the leach liquor is a nitric acid solution by adding a soluble neutralizing agent thereto, subjecting said adjusted leach liquor to an elevated temperature in excess of 130°C at a pressure of about 225 to 1000 psig, thereby precipitating said iron and aluminum at said elevated temperature and pressure, separating the iron and aluminum precipitate from the treated liquor, and then recovering the nickel and cobalt from said liquor.

2. The method of claim 1, wherein the temperature of the acid leach liquor ranges from about 200°C to 280°C.

3. The method of claim 2, wherein the leach solution comprises sulfuric acid adjusted to a pH range of about 0.6 to 1.5, and wherein the pressure ranges from about 450 to 600 psig.

4. The method of claim 2, wherein the temperature is approximately 240°C.

5. The method of claim 3, wherein the pH is approximately 1.

6. The method of claim 2, wherein the leach solution comprises nitric acid adjusted to a pH range of about 0.3 to 1, and wherein the pressure ranges from about 450 to 600 psig.

7. In a method of recovering nickel and cobalt from nickeliferous oxidic ore, wherein the ore is acid leached with a solution selected from the group consisting of sulfuric acid and nitric acid to produce a leach liquor containing substantially said nickel and cobalt and also containing iron and aluminum, and wherein the iron and aluminum are thereafter separated from the nickel and cobalt, the improvement which comprises, adjusting said leach liquor to a pH over the range of about 0.5 to 4 where the leach liquor is a sulfuric acid solution and to a pH over the range of about 0.15 to 2.5 where the leach liquor is a nitric acid solution by adding magnesia thereto, subjecting said adjusted leach liquor to an elevated temperature in excess of 130°C at a pressure of about 225 to 1000 psig, thereby precipitating said iron and aluminum at said elevated temperature and pressure, separating the iron and aluminum precipitate from the treated liquor, and then recovering the nickel and cobalt from said liquor.

8. The method of claim 7, wherein the temperature of the leach liquor ranges from about 200°C to 280°C.

9. The method of claim 8, wherein the leach solution comprises sulfuric acid adjusted to a pH range of about 0.6 to 1.5, and wherein the pressure ranges from about 450 to 600 psig.

10. The method of claim 8, wherein the temperature is approximately 240°C.

11. The method of claim 10, wherein the pH is approximately 1.

12. The method of claim 8, wherein the leach solution comprises nitric acid adjusted to a pH range of about 0.3 to 1, and wherein the pressure ranges from about 450 to 600 psig.

* * * * *